(12) United States Patent
He

(10) Patent No.: US 10,652,908 B2
(45) Date of Patent: May 12, 2020

(54) TECHNIQUES AND APPARATUSES FOR DYNAMIC PRIORITIZATION FOR DELAY-SENSITIVE SERVICES

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/057,680

(22) Filed: Aug. 7, 2018

(65) Prior Publication Data

US 2019/0053250 A1  Feb. 14, 2019

Related U.S. Application Data

(60) Provisional application No. 62/544,338, filed on Aug. 11, 2017.

(51) Int. Cl.
| | | |
|---|---|---|
| *H04W 72/10* | (2009.01) | |
| *H04W 72/12* | (2009.01) | |
| *H04W 72/00* | (2009.01) | |
| *H04W 28/00* | (2009.01) | |
| *H04L 1/00* | (2006.01) | |

(Continued)

(52) U.S. Cl.
CPC .......... *H04W 72/10* (2013.01); *H04L 1/0026* (2013.01); *H04L 27/30* (2013.01); *H04L 47/2433* (2013.01); *H04W 28/00* (2013.01); *H04W 28/0278* (2013.01); *H04W 72/00* (2013.01); *H04W 72/1242* (2013.01); *H04W 72/1284* (2013.01)

(58) Field of Classification Search
CPC . H04W 72/10; H04W 72/1242; H04W 28/00; H04W 28/0278; H04W 72/1284; H04L 1/0026; H04L 47/2433
See application file for complete search history.

(56) References Cited

U.S. PATENT DOCUMENTS

| | | | |
|---|---|---|---|
| 9,247,550 B2 * | 1/2016 | Kim ..................... | H04W 72/08 |
| 2014/0079031 A1 * | 3/2014 | Parkvall ............... | H04L 5/0058 |
| | | | 370/336 |

(Continued)

FOREIGN PATENT DOCUMENTS

| | | |
|---|---|---|
| WO | WO-2011121112 A1 | 10/2011 |
| WO | WO-2014003623 A1 | 1/2014 |

OTHER PUBLICATIONS

International Search Report and Written Opinion—PCT/US2018/045747—ISA/EPO—dated Nov. 6, 2018.

*Primary Examiner* — Chi H Pham
*Assistant Examiner* — Fahmida S Chowdhury
(74) *Attorney, Agent, or Firm* — Harrity & Harrity, LLP

(57) ABSTRACT

Certain aspects of the present disclosure generally relate to wireless communication. In some aspects, a user equipment may determine, for a first logical channel, that a first delay threshold for the first logical channel is satisfied. The user equipment may remap data from the first logical channel to a second logical channel, wherein the second logical channel is prioritized over the first logical channel and is associated with a second delay threshold that is less than the first delay threshold. In some aspects, the user equipment may send a buffer status report which includes information about the second logical channel. Numerous other aspects are provided.

30 Claims, 9 Drawing Sheets

900

910
Determine that a first delay threshold is satisfied for Data 905

915
Remap Data 905 from LCH1 to LCH2

(51) Int. Cl.
*H04L 27/30* (2006.01)
*H04L 12/851* (2013.01)
*H04W 28/02* (2009.01)

(56) References Cited

U.S. PATENT DOCUMENTS

| | | | |
|---|---|---|---|
| 2014/0161083 A1* | 6/2014 | Nobukiyo | H04W 72/042 370/329 |
| 2014/0177560 A1* | 6/2014 | Guo | H04W 52/365 370/329 |
| 2016/0029245 A1* | 1/2016 | Hong | H04W 28/0278 370/329 |
| 2016/0205580 A1* | 7/2016 | Pragada | H04W 16/14 370/252 |
| 2016/0227433 A1* | 8/2016 | Lee | H04W 72/1242 |
| 2018/0184312 A1* | 6/2018 | Yi | H04L 43/06 |

\* cited by examiner

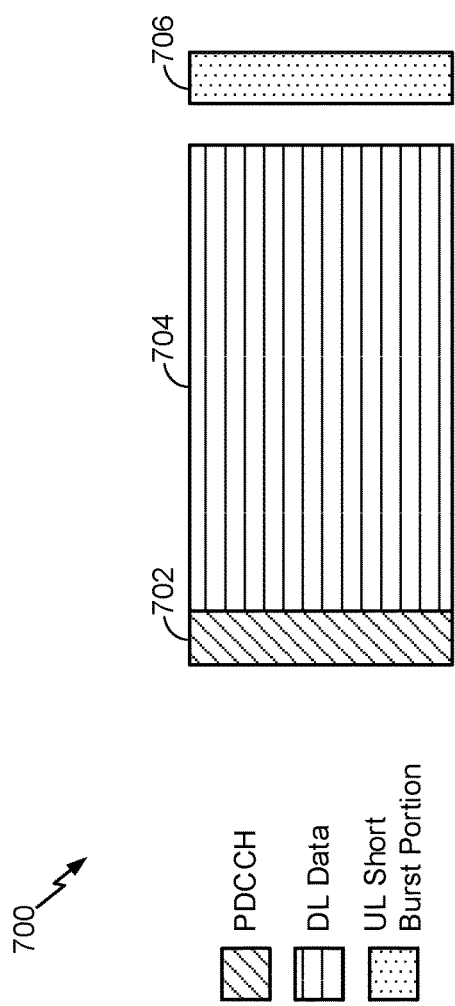
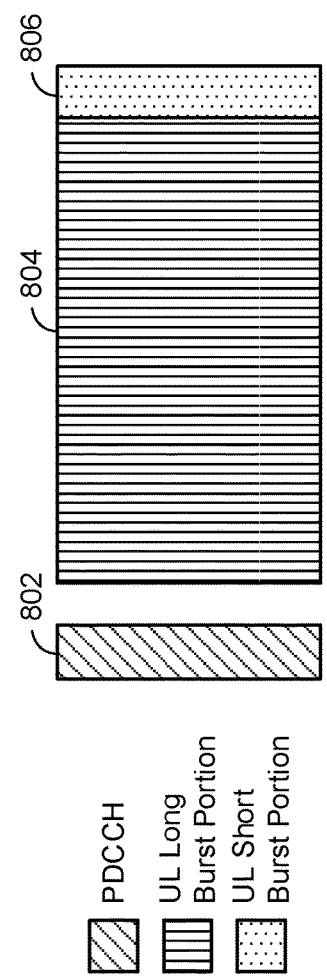
FIG. 7
FIG. 8

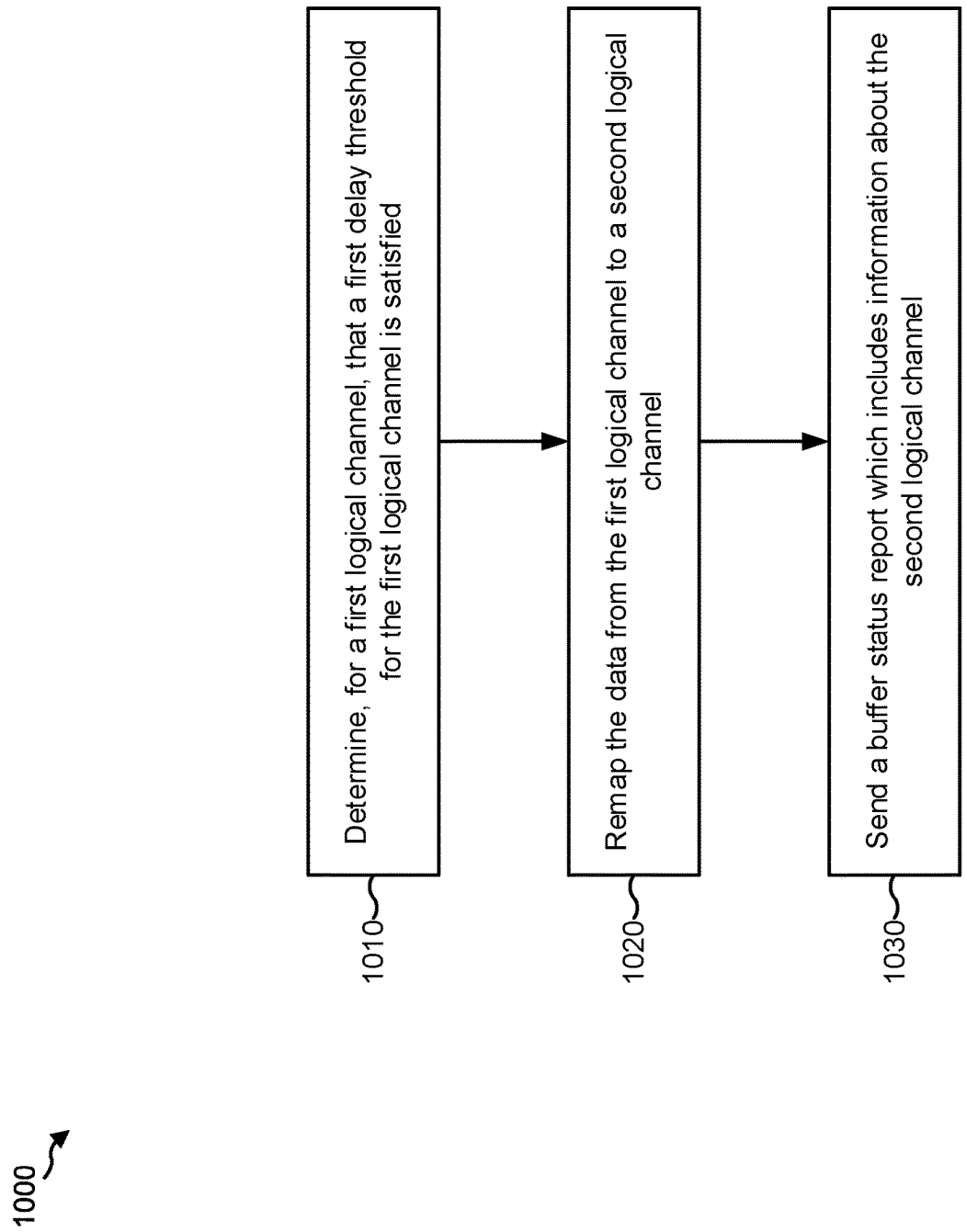

TECHNIQUES AND APPARATUSES FOR DYNAMIC PRIORITIZATION FOR DELAY-SENSITIVE SERVICES

CROSS-REFERENCE TO RELATED APPLICATIONS UNDER 35 U.S.C. § 119

This application claims priority to Provisional Patent Application No. 62/544,338, filed on Aug. 11, 2017, entitled "TECHNIQUES AND APPARATUSES FOR DYNAMIC PRIORITIZATION FOR DELAY-SENSITIVE SERVICES," which is hereby expressly incorporated by reference herein.

FIELD OF THE DISCLOSURE

Aspects of the present disclosure generally relate to wireless communication, and more particularly to techniques and apparatuses for dynamic prioritization for delay-sensitive services.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include determining, for a first logical channel, that a first delay threshold for the first logical channel is satisfied. The method may include remapping data from the first logical channel to a second logical channel, wherein the second logical channel is associated with a second delay threshold that is less than the first delay threshold. The method may include sending a buffer status report which includes information about the second logical channel.

In some aspects, a user equipment for wireless communication may include a memory and one or more processors coupled to the memory. The one or more processors may be configured to determine, for a first logical channel, that a first delay threshold for the first logical channel is satisfied. The one or more processors may be configured to remap data from the first logical channel to a second logical channel, wherein the second logical channel is associated with a second delay threshold that is less than the first delay threshold. The one or more processors may be configured to send a buffer status report which includes information about the second logical channel.

In some aspects, a non-transitory computer-readable medium may store one or more instructions for wireless communication. The one or more instructions, when executed by one or more processors of a user equipment, may cause the one or more processors to determine, for a first logical channel, that a first delay threshold for the first logical channel is satisfied. The one or more instructions, when executed by the one or more processors, may cause the one or more processors to remap data from the first logical channel to a second logical channel, wherein the second logical channel is associated with a second delay threshold that is less than the first delay threshold. The one or more instructions, when executed by the one or more processors, may cause the one or more processors to send a buffer status report which includes information about the second logical channel.

In some aspects, an apparatus for wireless communication may include means for determining, for a first logical channel, that a first delay threshold for the first logical channel is satisfied. The apparatus may include means for remapping data from the first logical channel to a second logical channel, wherein the second logical channel is associated with a second delay threshold that is less than the first delay threshold. The apparatus may include means for sending a buffer status report which includes information about the second logical channel.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with various aspects of the present disclosure.

FIG. 8 is a diagram illustrating an example of an uplink (UL)-centric subframe, in accordance with various aspects of the present disclosure.

FIG. 10 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
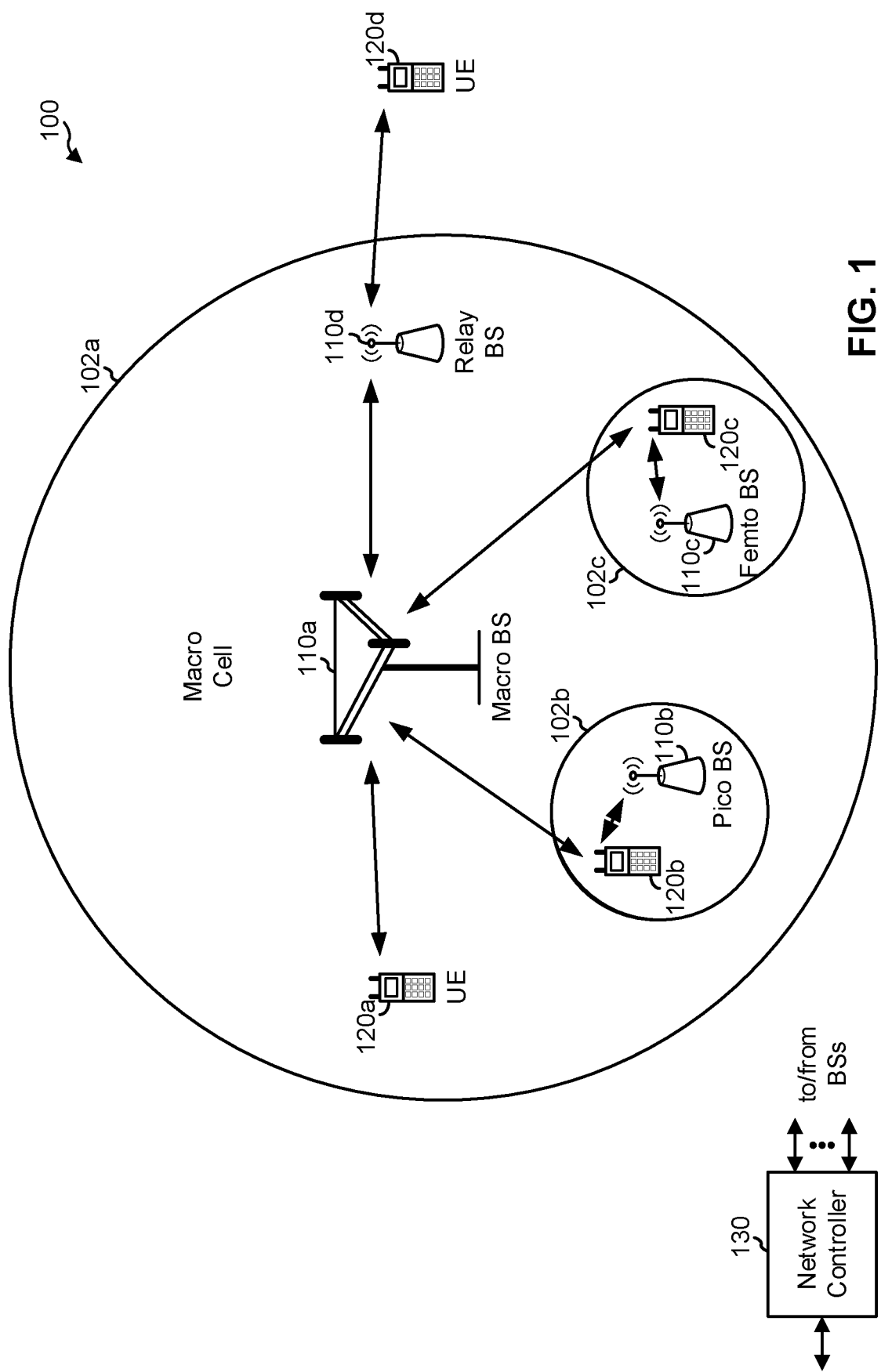
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
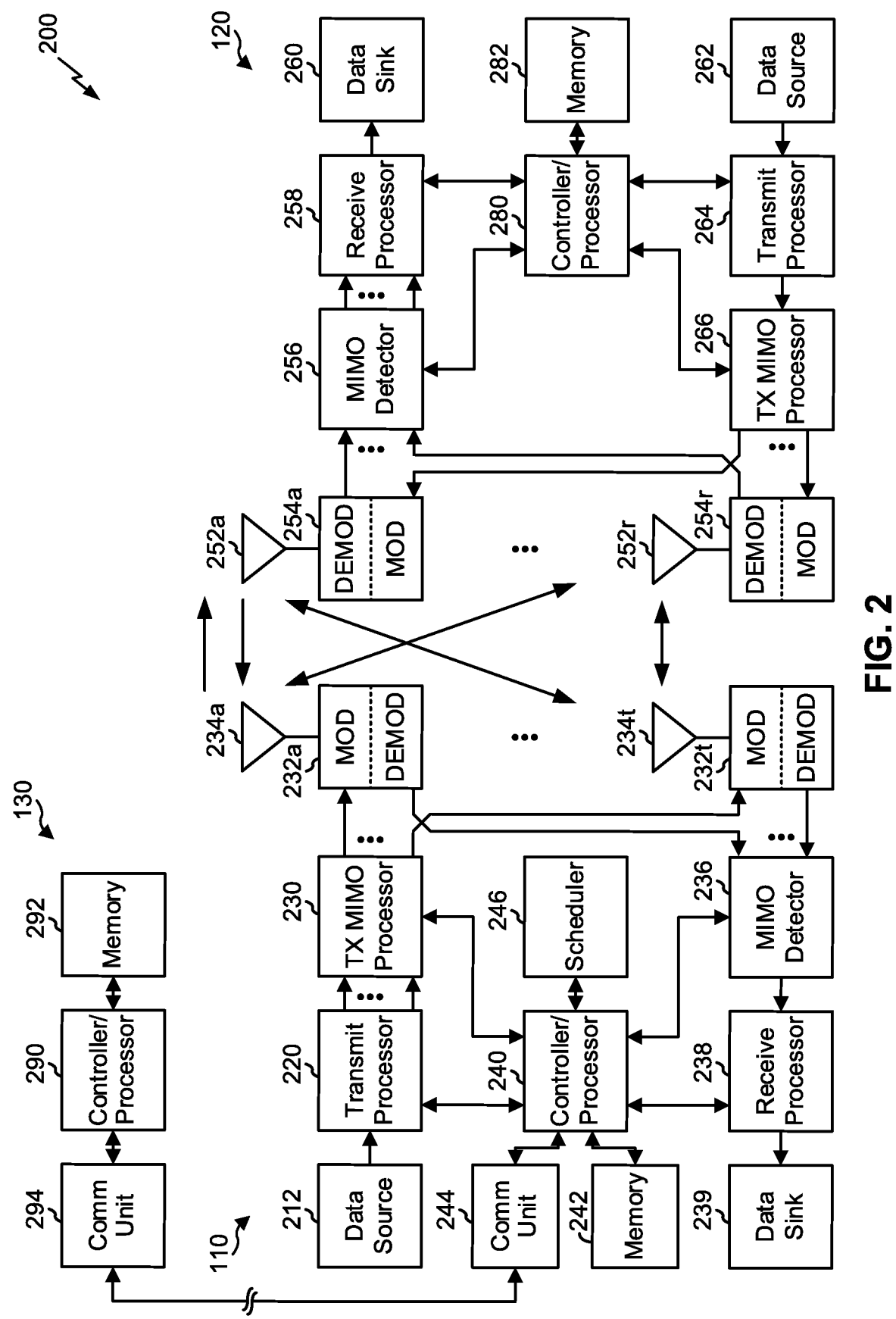
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. In some aspects, one or more components of UE 120 may be included in a housing.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic prioritization for delay-sensitive services, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining, for data buffered for a first logical channel, that a first delay threshold for the first logical channel is satisfied, means for remapping the data from the first logical channel to a second logical channel, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
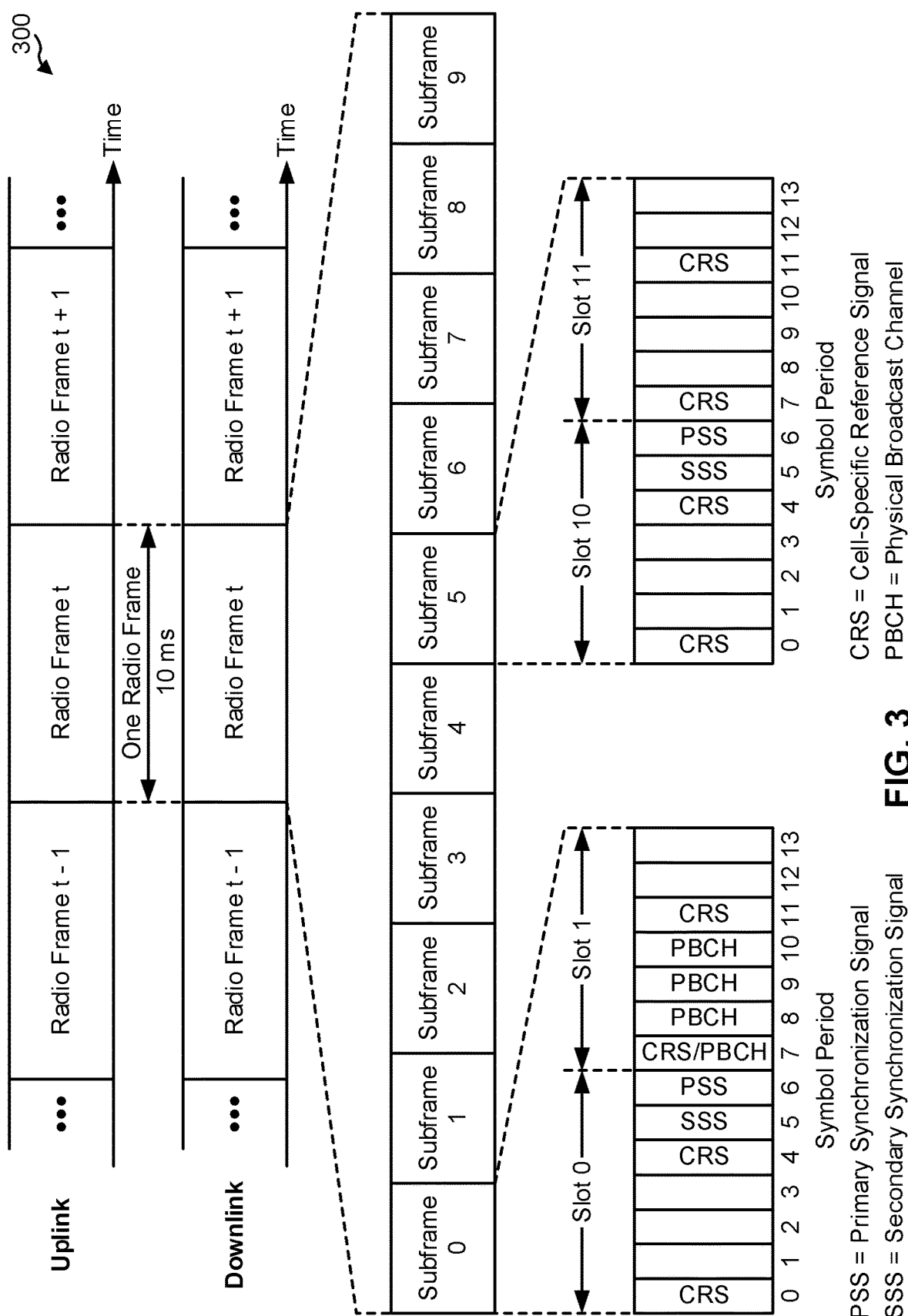
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2 L symbol periods in each subframe may be assigned indices of 0 through 2 L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
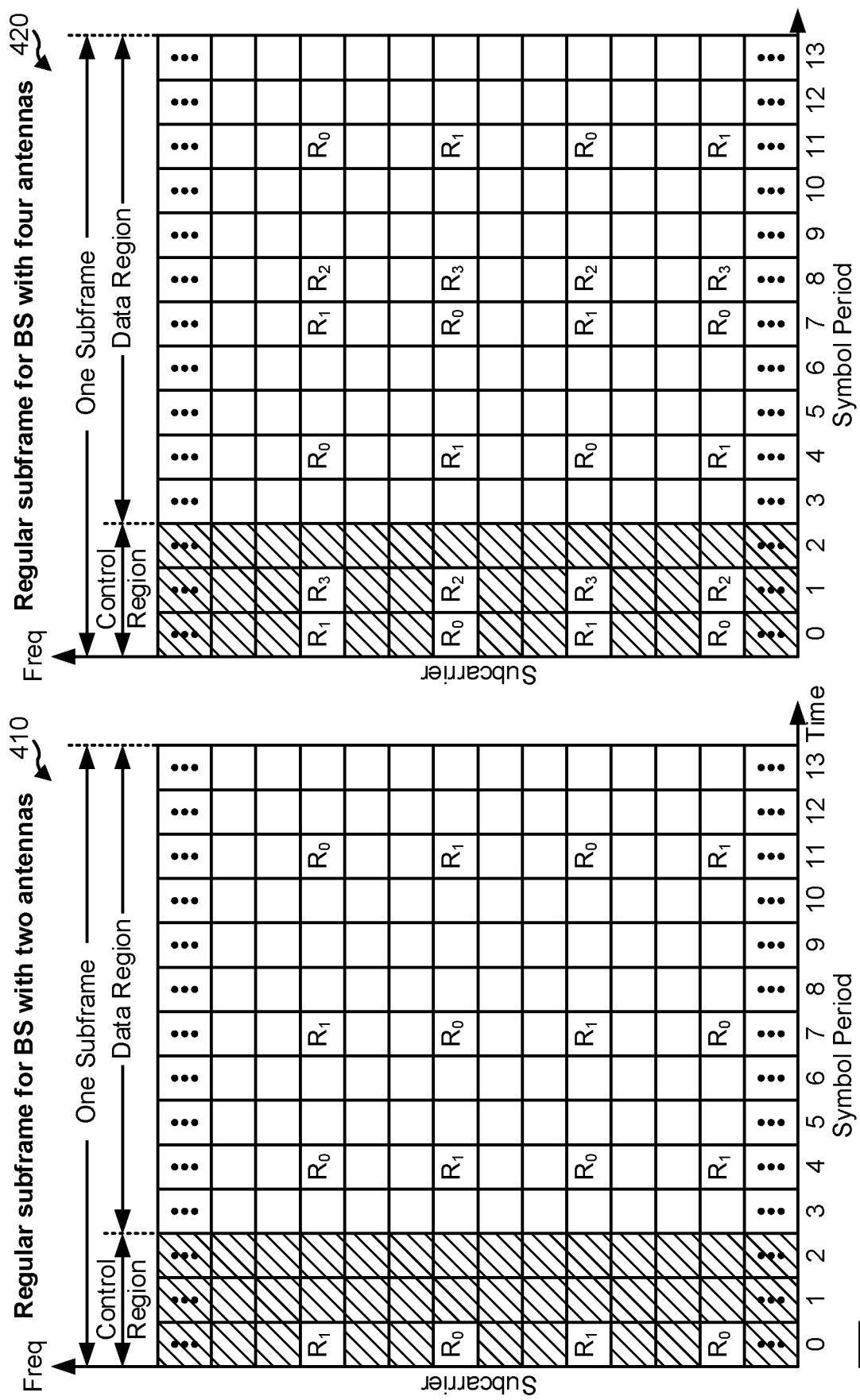
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
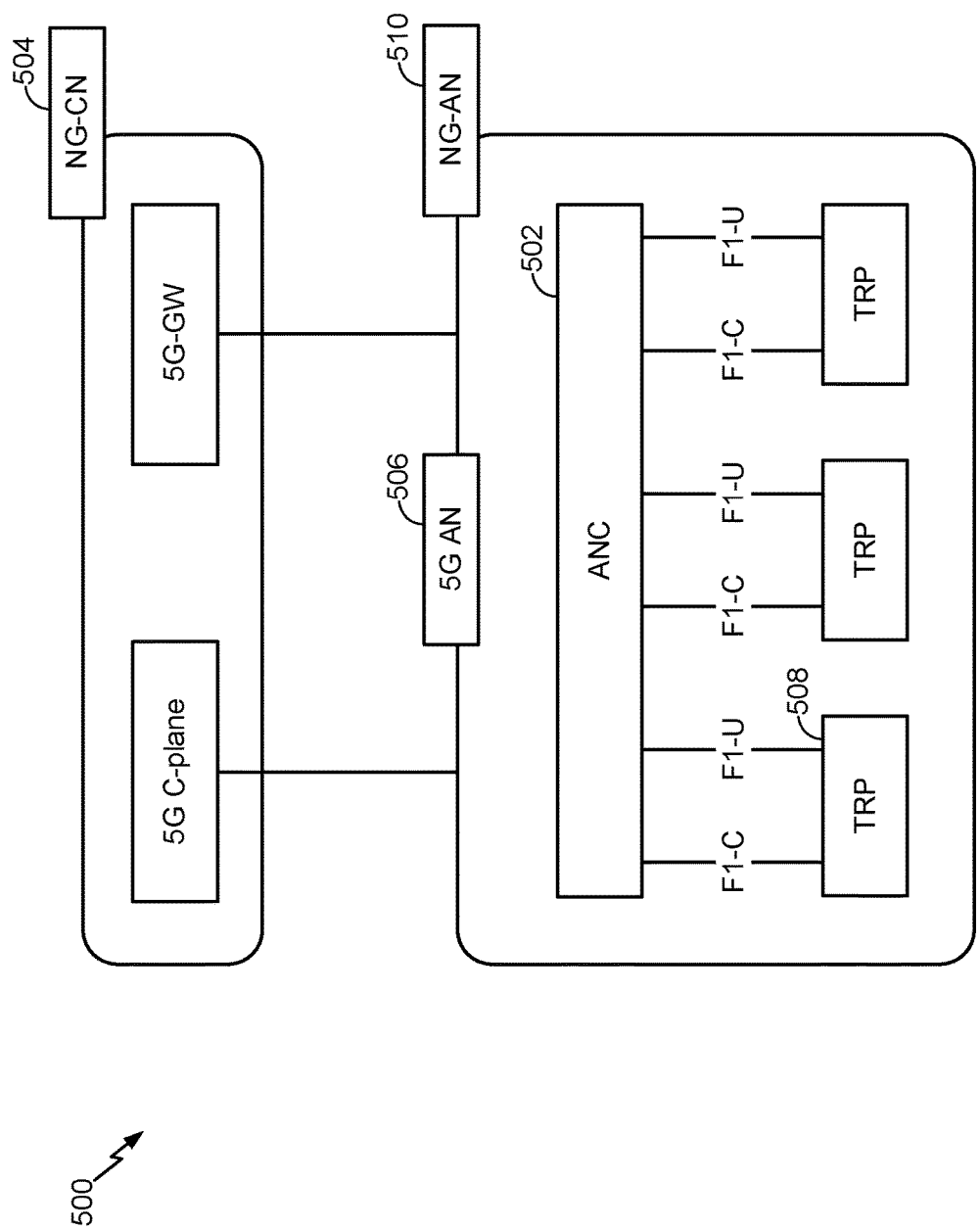
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
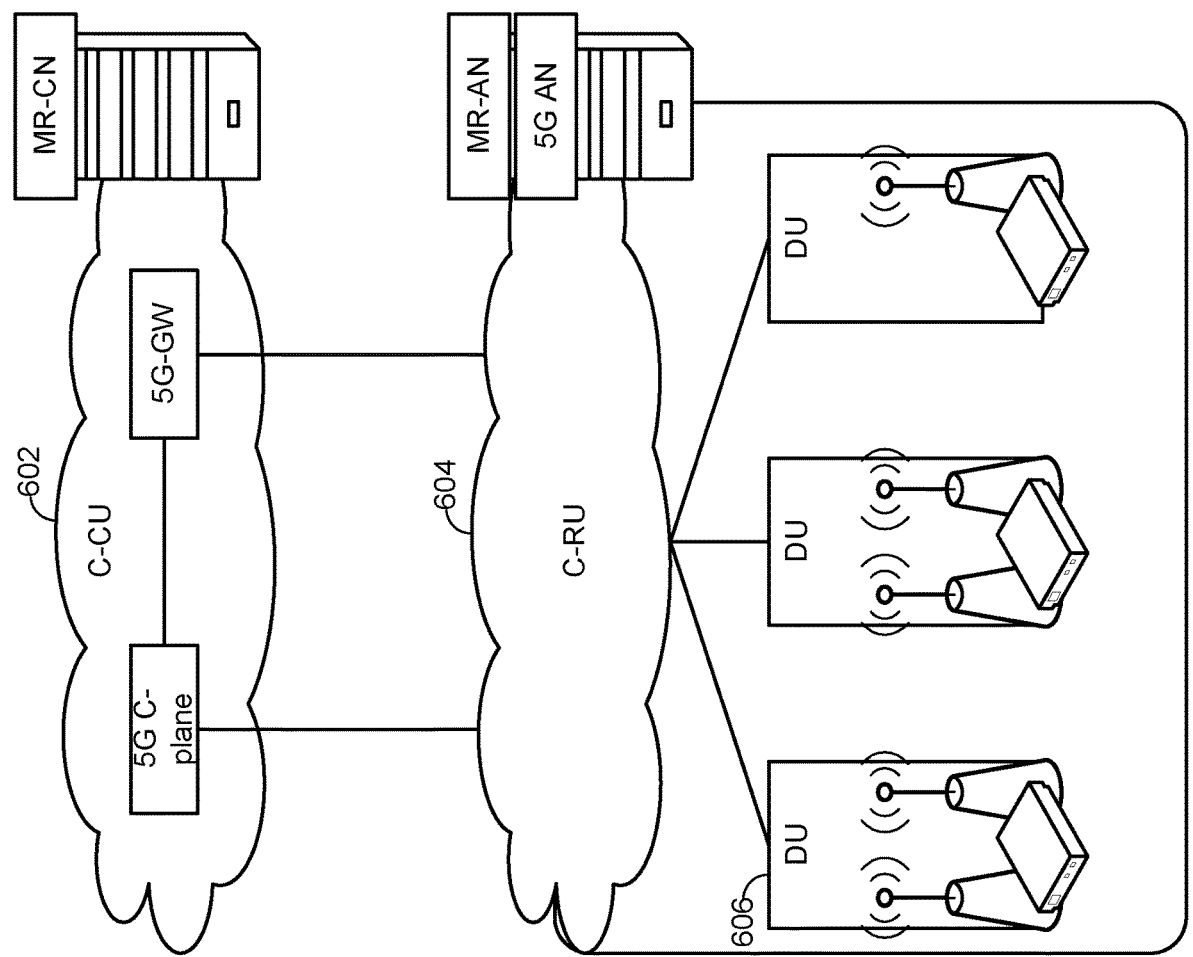
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

Some services for communication may be classified as delay-sensitive services. For example, a service, such as a real-time voice communication service, a real-time video service, and/or the like, may be classified as a delay-sensitive service based at least in part on a delay deadline for maintaining a level of performance for a service being less than a threshold delay deadline. When delay-sensitive data, of a delay-sensitive service, is not transmitted before the delay deadline, a delay-sensitive service may experience degraded performance. For example, a real-time video service may experience playback interruptions that may result in a poor user experience.

A UE may queue delay-sensitive data of a delay-sensitive service in a buffer for transmission to a BS. The queue may be associated with a prioritization, a set of quality of service (QoS) parameters, and/or the like. For example, a first queue for voice application services may be associated with a lesser prioritization than a second queue for ultra-reliable low-latency communications (URLLC) services. However, scheduling based at least in part on the prioritizations of the queues may fail to account for delay deadlines, a maximum data burst volume (MDBV) parameter, a packet delay budget (PDB) parameter, and/or the like. As a result, in some cases, a prioritization of a queue being used for delay-sensitive data relative to other queues may result in the delay-sensitive data failing to be scheduled for transmission before the delay deadline for the delay-sensitive data.

Mapping a logical channel associated with a queue to multiple numerologies associated with multiple prioritizations can reduce a likelihood of delay-sensitive data failing to be scheduled before expiration of a delay deadline. For example, a logical channel for real-time video services may be mapped to an enhanced Mobile Broadband (eMBB) numerology and a URLLC numerology. However, the real-time video service may be associated with a latency requirement of, for example, approximately 10 milliseconds (ms) as compared with a latency requirement of approximately 1 ms for URLLC traffic. As a result, although the logical channel may receive additional resource allocations for scheduling as a result of the multiple numerologies, the delay-sensitive data of the real-time video service may fail to be allocated resources until the URLLC traffic for the logical channel has been allocated resources. Moreover, a buffer status report of the logical channel may not include information identifying an amount of delay already experienced by the delay-sensitive data, resulting in a BS failing to allocate additional resources for the delay-sensitive data.

Some aspects, described herein, may provide a mechanism for a UE to remap data from a first logical channel associated with a first QoS flow and with a first delay threshold to a second logical channel associated with a second QoS flow and with a higher prioritization than the first logical channel and a second delay threshold that is less than the first delay threshold. For example, the UE may determine that the first delay threshold is satisfied for delay-sensitive data, and may remap the delay-sensitive data from the first logical channel to the second logical channel to cause the delay-sensitive data to be transmitted using the second logical channel. In this case, the first delay threshold may be a first packet delay budget and the second threshold may be a second packet delay budget, and the delay-sensitive data may be mapped from the first QoS flow to the second QoS flow to avoid exceeding a delay limit associated with the first packet delay budget and the second packet delay budget. In this way, the UE may enable the delay-sensitive data to be transmitted without a delay deadline expiring, which may improve network performance for delay-sensitive services.

Figure 9:
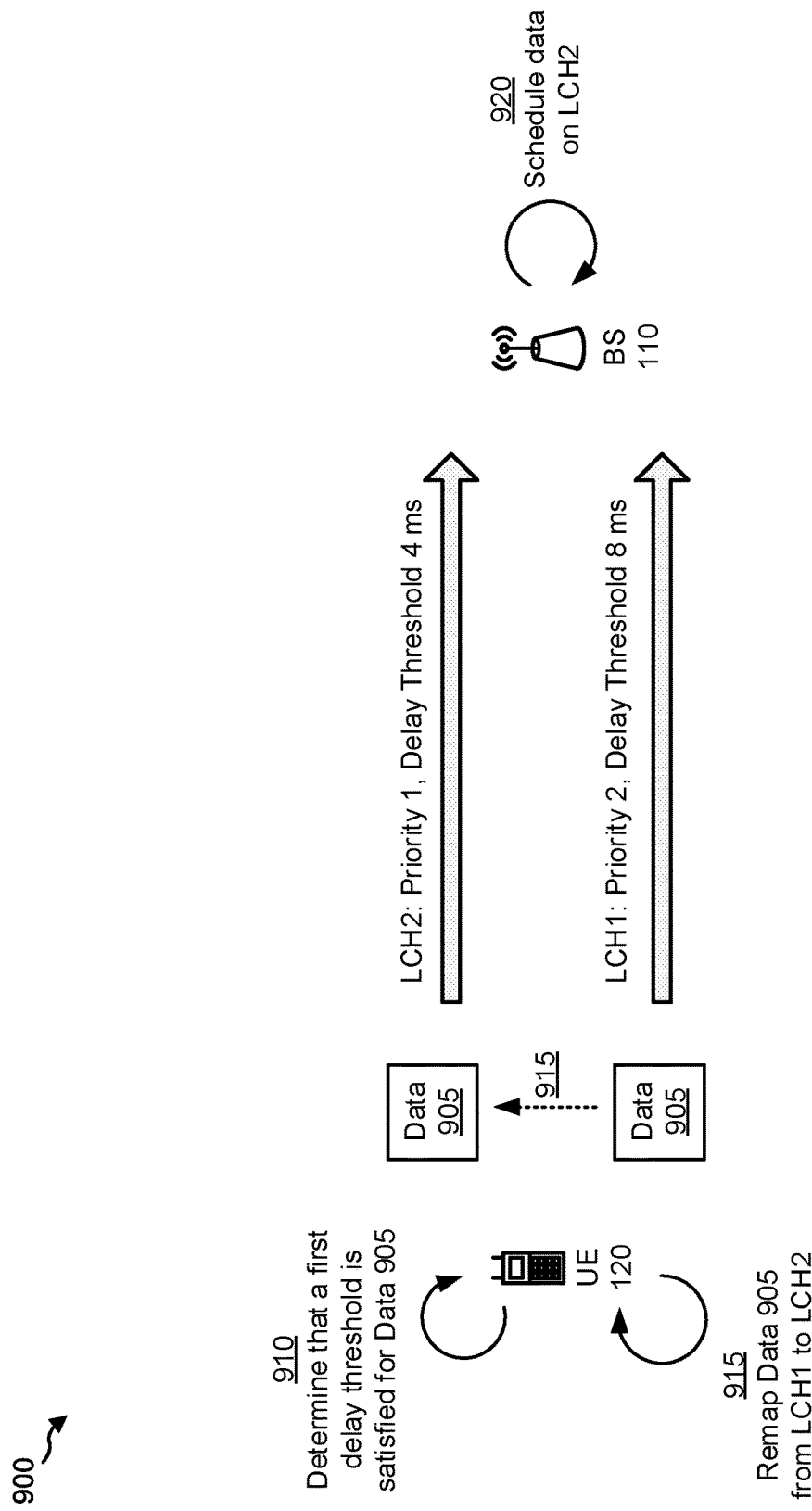
FIG. 9 is a diagram illustrating an example of dynamic prioritization for delay-sensitive services, in accordance with various aspects of the present disclosure.

FIG. 9 is a diagram illustrating an example 900 of dynamic prioritization for delay-sensitive services, in accordance with various aspects of the present disclosure. As shown in FIG. 9, example 900 includes a BS 110 and a UE 120 connected via a first logical channel (LCH1) associated with a first QoS flow and a second logical channel (LCH2) associated with a second QoS flow. In some aspects, data 905 may be in a buffer of the first logical channel. The first logical channel may be associated with a first prioritization and a first delay threshold (e.g., a first packet delay budget). The second logical channel may be associated with a second prioritization and a second delay threshold (e.g., a second packet delay budget). The second prioritization may be higher than the first prioritization and the second delay threshold may be less than the first delay threshold.

As further shown in FIG. 9, and by reference number 910, UE 120 may determine that a first delay threshold is satisfied for data 905. For example, UE 120 may determine that an accumulated delay of data 905 buffered for the first logical channel exceeds a configured delay threshold for the first logical channel. In some aspects, the delay threshold may be preconfigured for the first logical channel. For example, UE 120 may receive information from BS 110 associated with configuring the delay threshold for the first logical channel. In some aspects, the delay threshold of the first logical channel may be configured based at least in part on a prioritization of the first logical channel. For example, UE 120 and/or BS 110 may configure a longer delay threshold for the first logical channel relative to the second logical channel based at least in part on the first logical channel being associated with a lower priority than the second logical channel.

In some aspects, the first logical channel and/or the second logical channel may be delay-sensitive logical channels. For example, based at least in part on determining that the first logical channel and the second logical channel are to be used for delay-sensitive data (e.g., data 905), UE 120 may configure delay thresholds for the first logical channel and the second logical channel. In some aspects, the first delay threshold may be less than a delay deadline associated with data 905. For example, UE 120 may determine that the first delay threshold is satisfied before expiration of the delay deadline to enable UE 120 to remap data 905 to the second logical channel and transmit data 905 before the delay deadline expires.

As further shown in FIG. 9, and by reference number 915, UE 120 may remap data 905 from the first logical channel to the second logical channel. For example, based at least in part on determining that an accumulated delay for data 905 exceeds the first delay threshold, UE 120 may remap data 905 from the first logical channel to the second logical channel. In this way, UE 120 may avoid a delay limit associated with a packet delay budget being exceeded (e.g., by remapping data 905 to the second logical channel with a second delay threshold that satisfies the second packet delay budget of the second QoS flow, which may be a delay critical QoS flow).

In some aspects, remapping data 905 may trigger a buffer status report. For example, based at least in part on remapping data 905 to the second logical channel, UE 120 may trigger a buffer status report regarding a buffer status of the second logical channel. In this case, BS 110 may allocate resources for scheduling data 905 for transmission on the second logical channel, as shown by reference number 920, and UE 120 may transmit data 905 via the second logical channel.

In some aspects, data 905 is processed as new data for the second logical channel when data 905 is remapped to the second logical channel. For example, UE 120 may remap data 905, which may cause the buffer status report to be triggered and/or data 905 to be scheduled for transmission and transmitted without additional signaling associated with the remapping. In this way, UE 120 reduces a likelihood that delay-sensitive data is delayed in a logical channel for greater than a delay deadline relative to maintaining data 905 in a single logical channel or mapping the single logical channel to multiple numerologies. In some aspects, the buffer status report may be triggered when the second logical channel is associated with a highest priority relative to other logical channels (e.g., in a case with other logical channels).

In another case, where the second logical channel is not associated with the highest relative priority, the buffer status report may not be triggered.

In some aspects, UE 120 may schedule data 905 for transmission using a logical channel prioritization procedure. For example, based at least in part on resources being allocated for transmission on the second logical channel, UE 120 may cause a logical channel prioritization procedure to be performed to schedule data of the second logical channel and based at least in part on a priority of the second logical channel. In this case, based at least in part on the second logical channel being associated with a higher prioritization than the first logical channel, UE 120 may cause data 905 to be scheduled for transmission with less delay than on the first logical channel. In some aspects, UE 120 may trigger a buffer status report or a scheduling request for an uplink grant. For example, based at least in part on remapping data 905 to the second logical channel and triggering a buffer status report, UE 120 may trigger a scheduling request to cause BS 110 to provide resources for data buffered on the second logical channel (e.g., on a URLLC numerology) to be transmitted with a reduced latency relative to the first logical channel. In some aspects, UE 120 may not trigger a buffer status report or a scheduling request.

As indicated above, FIG. 9 is provided as an example. Other examples are possible and may differ from what was described with respect to FIG. 9.

FIG. 10 is a diagram illustrating an example process 1000 performed, for example, by a UE, in accordance with various aspects of the present disclosure. Example process 1000 is an example where a UE (e.g., UE 120) performs dynamic prioritization for delay-sensitive services.

As shown in FIG. 10, in some aspects, process 1000 may include determining, for a first logical channel, that a first delay threshold for the first logical channel is satisfied (block 1010). For example, the UE (e.g., using controller/processor 280 and/or the like) may determine that the data has been delayed for a period of time that exceeds the first delay threshold for the first logical channel, as described in more detail above.

As further shown in FIG. 10, in some aspects, process 1000 may include remapping the data from the first logical channel to a second logical channel (block 1020). For example, the UE (e.g., using controller/processor 280 and/or the like) may remap the data from the first logical channel to the second logical channel, which is prioritized over the first logical channel and is associated with a second delay threshold that is less than the first delay threshold, as described in more detail above.

As further shown in FIG. 10, in some aspects, process 1000 may include sending a buffer status report which includes information about the second logical channel (block 1030). For example, the UE (e.g., using controller/processor 280, transmit processor 264, TX MIMO processor 266, MOD 254, antenna 252, and/or the like) may send the buffer status report to a BS based at least in part on remapping the data from the first logical channel to the second logical channel, as described in more detail above.

Process 1000 may include additional aspects, such as any single aspect or any combination of aspects described below and/or in connection with one or more other processes described elsewhere herein.

In some aspects, at least one of the first delay threshold or the second delay threshold is preconfigured. In some aspects, the UE may trigger the buffer status report associated with the second logical channel. In some aspects, the UE may receive a grant to schedule the remapped data for transmission as a response to the buffer status report. In some aspects, the remapped data is scheduled as new data for the second logical channel. In some aspects, the remapped data is scheduled for transmission using a logical channel prioritization procedure based at least in part on a priority of the second logical channel.

In some aspects, the UE may receive a configuration for a plurality of logical channels including the first logical channel and the second logical channel, and each logical channel may be associated with a corresponding delay threshold. In some aspects, the first delay threshold and the second delay threshold relate to a prioritization of the second logical channel over the first logical channel. In some aspects, the remapped data may or may not trigger a scheduling request for an uplink grant.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 10 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications performed by a user equipment, comprising:
    determining, for a first logical channel and before an expiration of a delay deadline, that a first delay threshold for the first logical channel is satisfied,
        wherein the first delay threshold is a first packet delay budget; and
    remapping data from the first logical channel to a second logical channel, wherein the second logical channel is associated with a second delay threshold that is less than the first delay threshold; and sending a buffer status report which includes information about the second logical channel.

2. The method of claim 1, wherein at least one of the first delay threshold or the second delay threshold is preconfigured.

3. The method of claim 1, further comprising triggering the buffer status report associated with the second logical channel.

4. The method of claim 1, further comprising receiving a grant to schedule the remapped data for transmission as a response to the buffer status report.

5. The method of claim 1, wherein the remapped data is scheduled as new data for the second logical channel.

6. The method of claim 1, wherein the remapped data is scheduled for transmission using a logical channel prioritization procedure based at least in part on a priority of the second logical channel.

7. The method of claim 1, further comprising receiving a configuration for a plurality of logical channels including the first logical channel and the second logical channel,
    wherein each logical channel is associated with a corresponding delay threshold.

8. The method of claim 1, wherein the first delay threshold and the second delay threshold relate to a prioritization of the second logical channel over the first logical channel.

9. The method of claim 1, wherein the remapped data triggers a scheduling request for an uplink grant.

10. The method of claim 1, wherein the second delay threshold is a second packet delay budget.

11. A user equipment (UE), comprising: a memory; and one or more processors coupled to the memory, the one or more processors configured to cause the UE to:
    determine, for a first logical channel and before an expiration of a delay deadline, that a first delay threshold for the first logical channel is satisfied, wherein the first delay threshold is a first packet delay budget;
    remap data from the first logical channel to a second logical channel, wherein the second logical channel is associated with a second delay threshold that is less than the first delay threshold; and
    send a buffer status report which includes information about the second logical channel.

12. The UE of claim 11, wherein at least one of the first delay threshold or the second delay threshold is preconfigured.

13. The UE of claim 11, further comprising triggering the buffer status report associated with the second logical channel.

14. The UE of claim 11, further comprising receiving a grant to schedule the remapped data for transmission as a response to the buffer status report.

15. The UE of claim 11, wherein the remapped data is scheduled as new data for the second logical channel.

16. The UE of claim 11, wherein the remapped data is scheduled for transmission using a logical channel prioritization procedure based at least in part on a priority of the second logical channel.

17. The UE of claim 11, further comprising receiving a configuration for a plurality of logical channels including the first logical channel and the second logical channel,
wherein each logical channel is associated with a corresponding delay threshold.

18. The UE of claim 11, wherein the first delay threshold and the second delay threshold relate to a prioritization of the second logical channel over the first logical channel.

19. The UE of claim 11, wherein the remapped data triggers a scheduling request for an uplink grant.

20. The UE of claim 11, wherein the second delay threshold is a second packet delay budget.

21. An apparatus, comprising: means for determining, for a first logical channel and before an expiration of a delay deadline, that a first delay threshold for the first logical channel is satisfied,
wherein the first delay threshold is a first packet delay budget;
means for remapping data from the first logical channel to a second logical channel, wherein the second logical channel is associated with a second delay threshold that is less than the first delay threshold; and
means for sending a buffer status report which includes information about the second logical channel.

22. The apparatus of claim 21, wherein at least one of the first delay threshold or the second delay threshold is preconfigured.

23. The apparatus of claim 21, wherein the second delay threshold is a second packet delay budget.

24. A non-transitory computer-readable medium storing one or more instructions for wireless communication, the one or more instructions comprising:
one or more instructions that, when executed by one or more processors, cause the one or more processors to:
determine, for a first logical channel and before an expiration of a delay deadline, that a first delay threshold for the first logical channel is satisfied, wherein the first delay threshold is a first packet delay budget;
remap data from the first logical channel to a second logical channel, wherein the second logical channel is associated with a second delay threshold that is less than the first delay threshold; and send a buffer status report which includes information about the second logical channel.

25. The non-transitory computer-readable medium of claim 24, wherein at least one of the first delay threshold or the second delay threshold is preconfigured.

26. The non-transitory computer-readable medium of claim 24, wherein the second delay threshold is a second packet delay budget.

27. The apparatus of claim 21, further comprising:
means for triggering the buffer status report associated with the second logical channel.

28. The apparatus of claim 21, further comprising:
means for receiving a grant to schedule the remapped data for transmission as a response to the buffer status report.

29. The non-transitory computer-readable medium of claim 24, wherein the one or more instructions further comprise:
one or more instructions that, when executed by the one or more processors, cause the one or more processors to:
trigger the buffer status report associated with the second logical channel.

30. The non-transitory computer-readable medium of claim 24, wherein the one or more instructions further comprise:
one or more instructions that, when executed by the one or more processors, cause the one or more processors to:
receive a grant to schedule the remapped data for transmission as a response to the buffer status report.

* * * * *